United States Patent
Yoon et al.

(10) Patent No.: US 9,587,332 B2
(45) Date of Patent: Mar. 7, 2017

(54) FIBER-REINFORCED PLASTIC MATERIAL AND ELECTRONIC DEVICE INCLUDING THE SAME

(71) Applicant: Samsung Electronics Co., Ltd., Suwon-si, Gyeonggi-do (KR)

(72) Inventors: Byoung-Uk Yoon, Hwaseong-si (KR); Soo-Hyung Kim, Hwaseong-si (KR); Hyoung-Wook Yi, Yongin-si (KR); Jong-Chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 14/294,691

(22) Filed: Jun. 3, 2014

(65) Prior Publication Data
US 2015/0024811 A1    Jan. 22, 2015

(30) Foreign Application Priority Data
Jul. 16, 2013  (KR) ......................... 10-2013-0083405

(51) Int. Cl.
| | | |
|---|---|---|
| *H04M 1/00* | (2006.01) | |
| *D03D 1/00* | (2006.01) | |
| *H04M 1/02* | (2006.01) | |
| *H04B 1/3888* | (2015.01) | |
| *H04M 1/18* | (2006.01) | |

(52) U.S. Cl.
CPC ......... *D03D 1/0088* (2013.01); *D03D 1/0082* (2013.01); *H04B 1/3888* (2013.01); *H04M 1/0202* (2013.01); *D10B 2401/16* (2013.01); *D10B 2401/18* (2013.01); *D10B 2505/02* (2013.01); *H04M 1/185* (2013.01); *Y10T 428/2481* (2015.01)

(58) Field of Classification Search
CPC .... H04W 88/02–88/06; H04M 1/0214; H04M 1/23; H04M 1/6066; H04M 1/05; H04M 1/0216; H04M 1/0237; H04M 1/0235; H04Q 1/245; H01Q 1/245; H01Q 1/243; H04B 1/3838; H04B 1/05
See application file for complete search history.

(56) References Cited

U.S. PATENT DOCUMENTS

| | | |
|---|---|---|
| 5,783,278 A | 7/1998 | Nishimura et al. |
| 6,556,444 B2 | 4/2003 | Smith et al. |
| 2002/0086600 A1 | 7/2002 | Ghosh |
| 2003/0100239 A1 | 5/2003 | Gaffney et al. |
| 2004/0214496 A1 | 10/2004 | Yang |
| 2005/0085147 A1* | 4/2005 | Homma .................. B29C 70/22  442/218 |

(Continued)

FOREIGN PATENT DOCUMENTS

| | | |
|---|---|---|
| CA | 2 417 247 C | 5/2010 |
| CN | 102157286 A | 8/2011 |

(Continued)

*Primary Examiner* — San Htun
(74) *Attorney, Agent, or Firm* — Jefferson IP Law, LLP

(57) ABSTRACT

A fiber-reinforced plastic material is provided. The fiber-reinforced plastic material is woven with a plurality of yarns and a material property of at least a portion of the fiber-reinforced plastic material is different from another portion of the fiber-reinforced plastic material according to an arrangement direction or a weave pattern of the yarns or a material of the yarns.

28 Claims, 17 Drawing Sheets

(56) References Cited

U.S. PATENT DOCUMENTS

| | | |
|---|---|---|
| 2009/0126412 A1 | 5/2009 | Pollet et al. |
| 2010/0056232 A1* | 3/2010 | Lim ..................... H04M 1/185 |
| | | 455/575.1 |
| 2010/0289390 A1 | 11/2010 | Kenney |
| 2011/0255260 A1* | 10/2011 | Weber ................... H04M 1/026 |
| | | 361/807 |
| 2011/0290685 A1 | 12/2011 | Kenney |
| 2012/0077403 A1 | 3/2012 | Gaillard et al. |
| 2013/0137322 A1 | 5/2013 | Watanabe |
| 2013/0190052 A1* | 7/2013 | Lundell ............... H04M 1/0262 |
| | | 455/566 |

FOREIGN PATENT DOCUMENTS

| | | |
|---|---|---|
| CN | 102449211 A | 5/2012 |
| CN | 102461352 A | 5/2012 |
| CN | 103079819 A | 5/2013 |
| EP | 0426158 A2 | 5/1991 |
| JP | 2002-309008 A | 10/2002 |
| KR | 2010-0066933 A | 6/2010 |
| WO | 96-11105 A1 | 4/1996 |
| WO | 2010135069 A1 | 11/2010 |

\* cited by examiner

FIBER-REINFORCED PLASTIC MATERIAL AND ELECTRONIC DEVICE INCLUDING THE SAME

CROSS-REFERENCE TO RELATED APPLICATION(S)

This application claims the benefit under 35 U.S.C. §119(a) of a Korean patent application filed on Jul. 16, 2013 in the Korean Intellectual Property Office and assigned Serial No. 10-2013-0083405, the entire disclosure of which is hereby incorporated by reference.

TECHNICAL FIELD

The present disclosure relates to an electronic device. More particularly, the present disclosure relates to a fiber-reinforced plastic material and an electronic device including the same.

BACKGROUND

Various electronic devices, such as an electronic product, a communication device, and a mobile communication electronic device, include cases manufactured with metallic or synthetic resin materials. The metallic materials with which such cases are manufactured are heavy in weight and are difficult to mold/process. However, such metallic materials may sophisticate an exterior and are resistant to external shocks. The synthetic resin materials are easy to form into a designed shape and are light in weight, and thus may be useful in manufacturing any shape of electronic devices. However, such synthetic resin materials are slightly weak to external shocks.

According to the related art, design of an electronic device (e.g., a portable terminal), which is designed to be used while being carried, calls for a material having light weight, excellent moldability/processability, and high resistance to external shocks.

With the development of mobile communication services, multimedia functions have been emphasized in portable electronic devices and sizes of display devices mounted in the electronic devices have also increased. To maintain and secure portability in spite of the increasing size of the display device, the thickness and weight of the electronic device need to be reduced. To this end, the thickness and weight of the electronic device may be reduced by increasing the integration of a circuit device. As the integration of the circuit device increases, the electronic device is miniaturized to allow a user to use the electronic device while holding the electronic device by one hand.

The above information is presented as background information only to assist with an understanding of the present disclosure. No determination has been made, and no assertion is made, as to whether any of the above might be applicable as prior art with regard to the present disclosure.

SUMMARY

As the integration of the circuit device increases, heat emission may be intensified, for example, in the portable electronic device.

Aspects of the present disclosure are to address at least the above-mentioned problems and/or disadvantages and to provide at least the advantages described below. Accordingly, an aspect of the present disclosure is to provide a material capable of effectively spreading and emitting heat generated from the circuit device and an electronic device including the material.

Moreover, it is difficult to secure a space for installing various forms of input/output devices or antenna devices in a miniaturized portable electronic device. The present disclosure also provides a material capable of contributing to miniaturization while easily securing a space for installing an input/output device or an antenna device, and an electronic device including the material.

Other objects to be provided in the present disclosure may be understood by various embodiments described below.

In accordance with an aspect of the present disclosure, a fiber-reinforced plastic material is provided. The fiber-reinforced plastic material is woven with a plurality of yarns and a material property of at least a portion of the fiber-reinforced plastic material is different from another portion of the fiber-reinforced plastic material according to at least one of an arrangement direction, a weave pattern of the yarns, and a material of the yarns.

In accordance with another aspect of the present disclosure, an electronic device is provided. The electronic device includes a fiber-reinforced plastic material which is woven with a plurality of yarns and a material property of at least a portion of which is different from another portion according to at least one of an arrangement direction, a weave pattern of the yarns, and a material of the yarns.

In accordance with another aspect of the present disclosure, an electronic device is provided. The electronic device includes a circuit board and at least one cover member for receiving the circuit board, in which the cover member is made of a fiber-reinforced plastic material which is woven with a plurality of yarns and a material property of at least a portion of which is different from another portion according to at least one of an arrangement direction, a weave pattern of the yarns, and a material of the yarns.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As a non-exhaustive illustration only, a device described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), an optical disc player, a set-top box, and the like capable of wireless communication or network communication consistent with that disclosed herein.

Figure 1:
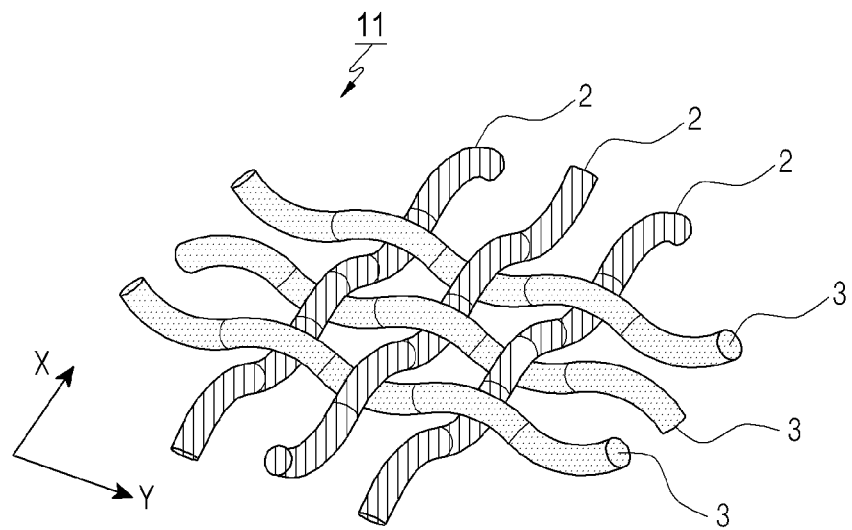
FIG. 1 is an enlarged view of a portion of a fiber-reinforced plastic material according to various embodiments of the present disclosure.
Figure 2:
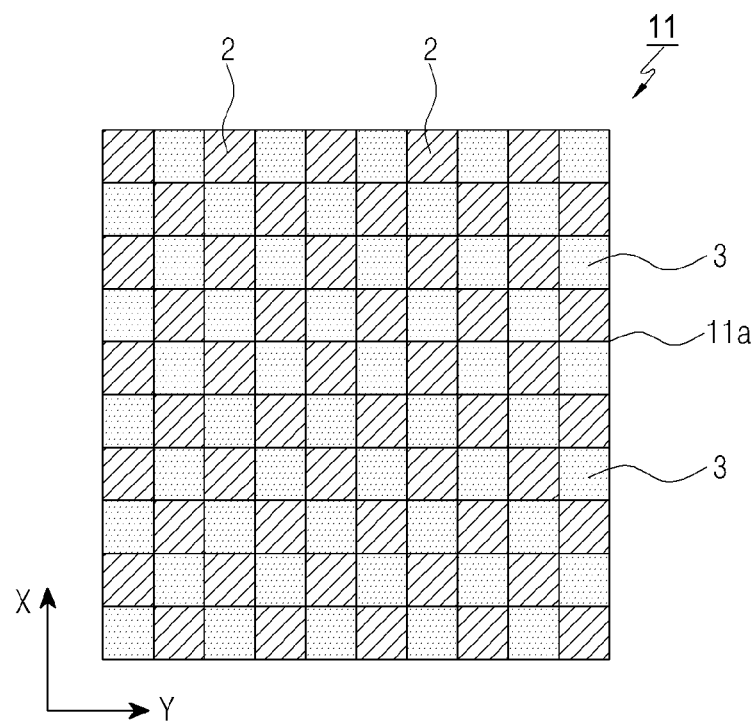
FIG. 2 illustrates a portion of a fiber-reinforced plastic material according to various embodiments of the present disclosure.
Figure 3:
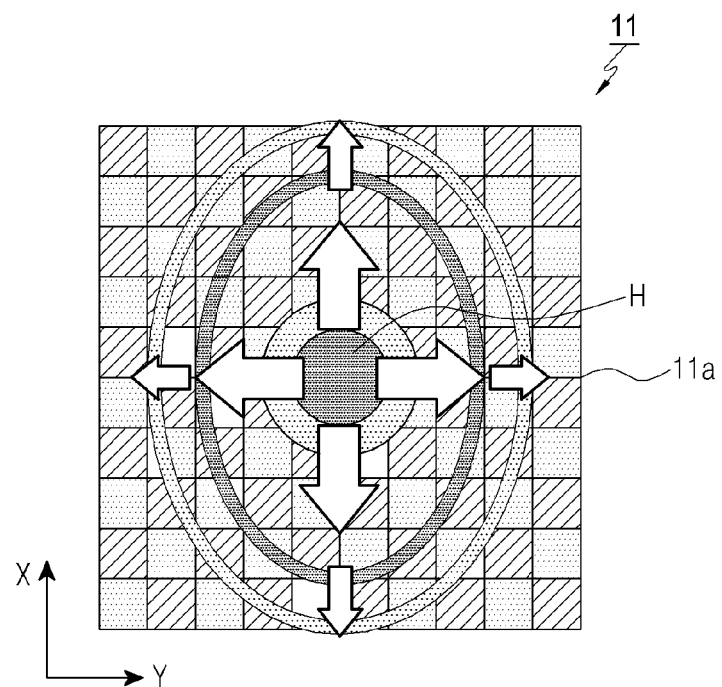
FIG. 3 is a diagram for describing temperature distribution of a fiber-reinforced plastic material according to various embodiments of the present disclosure.
Figure 4:
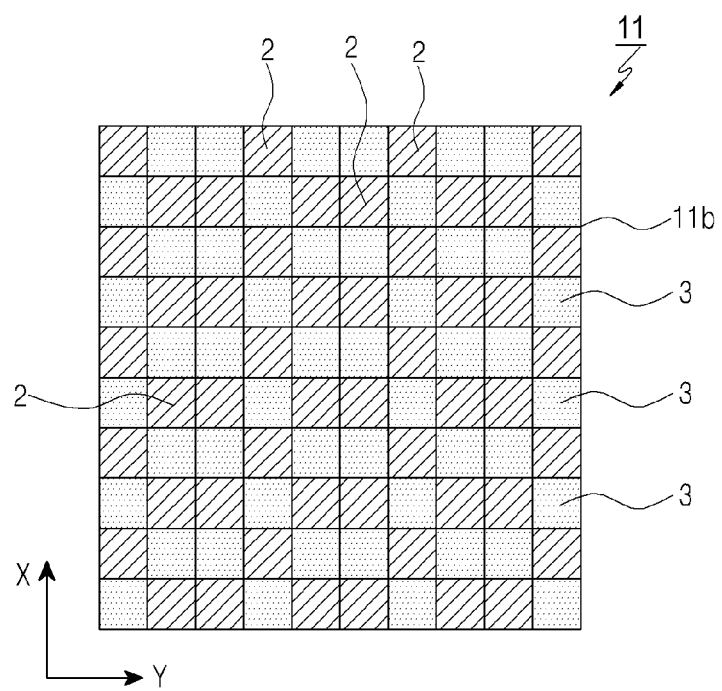
FIG. 4 illustrates a portion of a fiber-reinforced plastic material according to various embodiments of the present disclosure.
Figure 5:
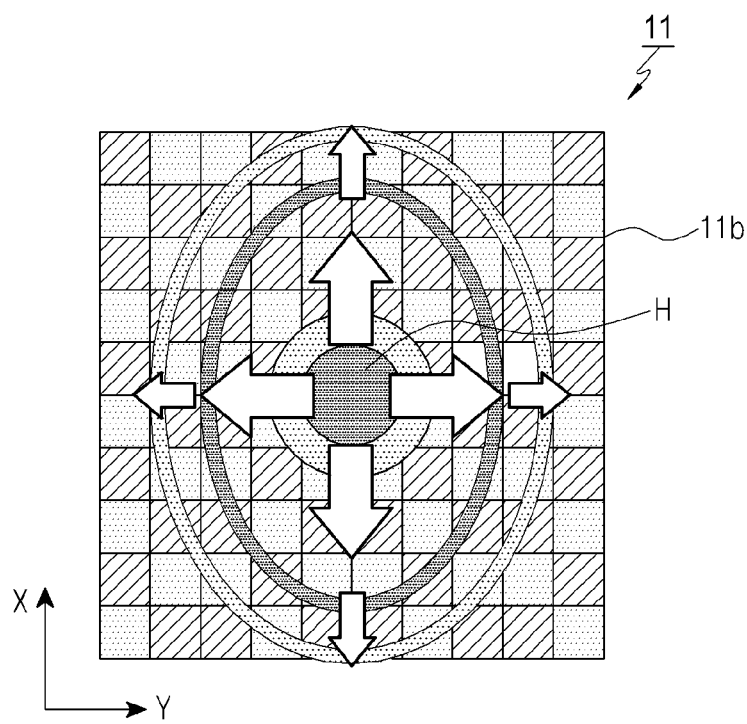
FIG. 5 is a diagram for describing temperature distribution of a fiber-reinforced plastic material according to various embodiments of the present disclosure.
Figure 6:
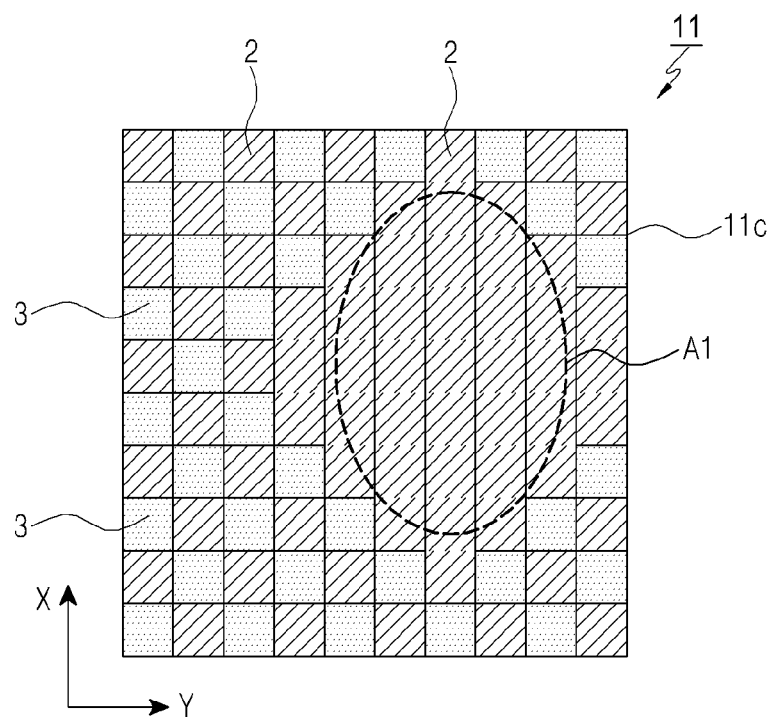
FIG. 6 illustrates a portion of a fiber-reinforced plastic material according to various embodiments of the present disclosure.
Figure 7:
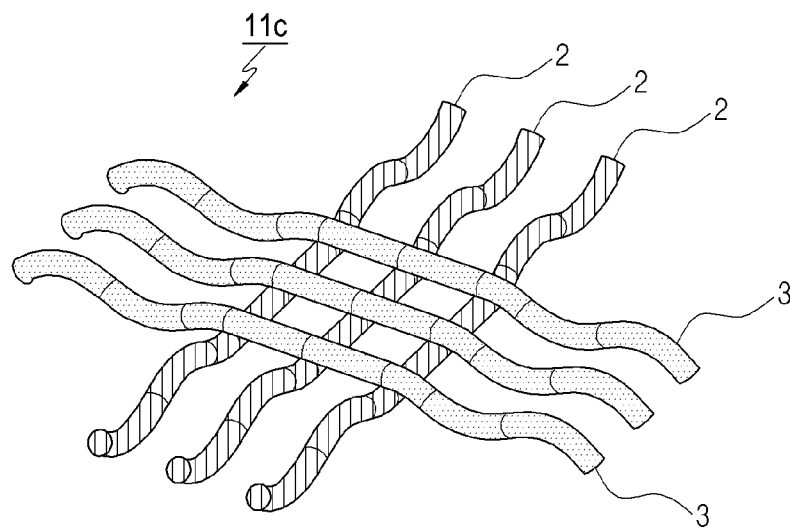
FIG. 7 is an enlarged view of a portion of a fiber-reinforced plastic material according to various embodiments of the present disclosure.

FIG. 1 is an enlarged view of a fiber-reinforced plastic material according to various embodiments of the present disclosure, FIG. 2 illustrates a portion of a fiber-reinforced plastic material according to various embodiments of the present disclosure, and FIG. 3 is a diagram for describing a heat conduction state of a fiber-reinforced plastic material according to various embodiments of the present disclosure. FIG. 4 illustrates a portion of a fiber-reinforced plastic material according to various embodiments of the present disclosure, FIG. 5 is a diagram for describing a heat conduction state of a fiber-reinforced plastic material according to various embodiments of the present disclosure, FIG. 6 illustrates a portion of a fiber-reinforced plastic material according to various embodiments of the present disclosure, and FIG. 7 is an enlarged view of a fiber-reinforced plastic material according to various embodiments of the present disclosure.

Referring to FIG. 1, a fiber-reinforced plastic material may be manufactured by compression after at least one prepreg woven with multiple yarns is stacked. FIG. 1 illustrates an enlarged portion of a prepreg 11 of the fiber-reinforced plastic material to show a woven structure of yarns 2 and 3.

The yarns 2 and 3 include first yarns 2 that extend along a first direction and are arranged in parallel and second yarns 3 that at least partially alternately intersect with the first yarns 2 and are also arranged in parallel. The first yarns 2 and the second yarns 3 may intersect obliquely or orthogonally with respect to each other. According to the woven structure of the first and second yarns 2 and 3, the prepreg 11 of the fiber-reinforced plastic material may be classified into a unidirectional structure, a plain structure, and a twill structure. The first and second yarns 2 and 3 of the fiber-reinforced plastic material may include glass fiber, carbon fiber, Kevlar fiber, and a Basalt material.

According to various embodiments of the present disclosure, at least a portion of the prepreg 11 may have material property, for example, a thermal conductivity or a dielectric constant, which is different from that of other portions of the prepreg 11. For example, according to arrangement directions or weave patterns of the first and second yarns 2 and 3 of the prepreg 11, a thermal conductivity in a certain direction may be higher than the thermal conductivity in other directions. According to various embodiments of the present disclosure, by using different materials for the first and second yarns 2 and 3 of the prepreg 11 or by using printing, dipping or deposition, the physical property of a desired portion may be made different from the same physical property of other portions. In addition, in a process of weaving the prepreg 11, a thermal conductivity may be set differently according to a direction by using at least one of arrangement directions and weave patterns of the first and second yarns 2 and 3 of the prepreg 11.

Referring to FIGS. 2 and 3, in relation to prepreg 11a, assuming that a direction in which the first yarns 2 extend is a 'first direction X' and a direction in which the second yarns 3 extend is a 'second direction Y', the first yarns 2 are arranged in the second direction Y and the second yarns 3 are arranged in the first direction X. Heat transferred through the first yarns 2 may be transferred faster in the first direction X than in the second direction Y, and heat transferred through the second yarns 3 may be transferred faster in the second direction Y than in the first direction X. If the first and second yarns 2 and 3 are arranged with the same material and the same condition, heat transferred through the prepreg 11a may form temperature distribution in the shape of a concentric circle, which is inversely proportional to a distance from a heat source H without having directivity.

In contrast, if the first and second yarns 2 and 3 have different materials, or different conditions, for example, different weave structures, then they may form different shapes of temperature distribution according to a distance from and a direction with respect to the heat source H. As illustrated in FIGS. 2 and 3, if the first and second yarns 2 and 3 are arranged in the same conditions, but the first yarns 2 are made of a material having a high conductivity, for example, a metallic material such as copper, then heat generated in the heat source H may be spread and emitted faster in the first direction X than in the second direction Y. For example, as illustrated in FIG. 3, if the second yarn 3 is made of a general fiber material and the first yarn 2 is made of a material having a high conductivity, then the prepreg 11a may have temperature distribution in an oval shape around the heat source H.

Referring to FIG. 4, a portion of a prepreg 11b as another example of the prepreg 11 according to various embodiments of the present disclosure, in which a weave structure of the yarns (2, 3) is modified, is provided.

As illustrated in FIG. 4, the prepreg 11b may have a weave structure in which among the first yarns 2 extending in the first direction X, each pair of adjacent first yarns 2 are positioned in parallel on the same plane. As an example, as illustrated in FIG. 5, in the prepreg 11b having a structure such as the structure illustrated in FIG. 4, even if the first and second yarns 2 and 3 are made of the same material, heat may be spread and emitted faster in a direction in which the first yarns 2 extend, for example, in the first direction X.

The prepregs 11a and 11b illustrated in FIGS. 2 through 5 are illustrated as having weave shapes of simple structures for brevity, but as mentioned previously, temperature distribution of a prepreg disposed in adjacent to a heat emitter may be set variously according to materials or a weave structure of yarns.

Referring to FIG. 6, a prepreg 11c capable of improving a thermal conductivity through modification of a weave structure of yarns as another example of the prepreg 11 of the fiber-reinforced plastic material according to various embodiments of the present disclosure is provided.

Referring to FIG. 6, a yarn extending in the first direction X, for example, the first yarn 2 may be disposed on a surface of the prepreg 11c, without alternately intersecting the second yarn 3 in a predetermined region A1. To provide a heat radiation structure using the prepreg 11c, the prepreg 11c may be disposed such that the first yarn 2 is adjacent to a heat emitter in the region A1. According to such a configuration, the prepreg 11c may spread or emit heat faster in the first direction X than in the second direction Y. According to various embodiments of the present disclosure, the first yarn 2 may be made of a material having a higher thermal conductivity than the second yarn 3.

According to various embodiments of the present disclosure, in order to spread or emit heat faster in the second direction Y, the second yarn 3 may be disposed in adjacent to the heat emitter in the region A1. According to various embodiments of the present disclosure, the second yarn 3 may be made of a material having a higher conductivity than the first yarn 2.

Referring to FIG. 7, an enlarged view of a weave structure of a prepreg such as, for example, the prepreg 11c illustrated in FIGS. 4 and 6, according to various embodiments of the present disclosure. Generally, the prepreg is manufactured such that the first and second yarns 2 and 3 alternately intersect. However, according to various embodiments of the present disclosure such as, for example, the prepreg illustrated in FIG. 7, the first yarn 2 may be disposed on a surface of the prepreg 11c and the second yarn 3 may be disposed on another surface of the prepreg 11c in a particular region as desired.

Generally, an electronic device may have a heat emitter, for example, a heat-emission electronic circuit device such as an Application Processor (AP). When the electronic device having the heat-emission electronic circuit device operates for a long time, a significant amount of heat may be generated from the electronic circuit device. If the generated heat is not spread or emitted fast, a hot spot is formed in a region adjacent to the heat-emission electronic circuit device, causing a low-temperature burn accident.

Figure 8:
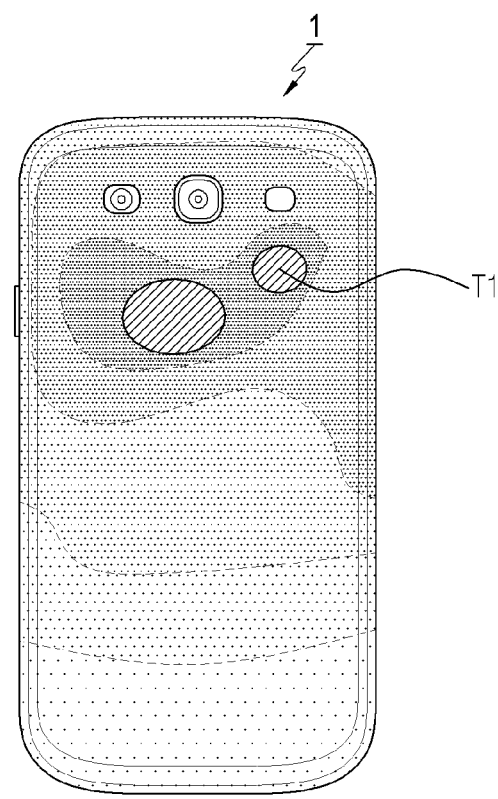
FIG. 8 illustrates an example of temperature distribution of a back surface of a general electronic device when the general electronic device operates according to various embodiments of the present disclosure.
Figure 9:
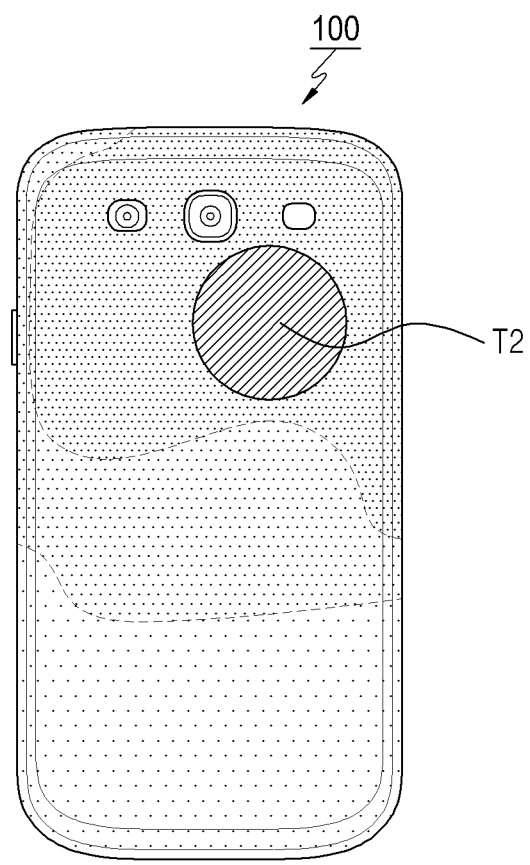
FIG. 9 illustrates an example of temperature distribution of a back surface of an electronic device when an electronic device including a fiber-reinforced plastic material operates, according to various embodiments of the present disclosure.
Figure 10:
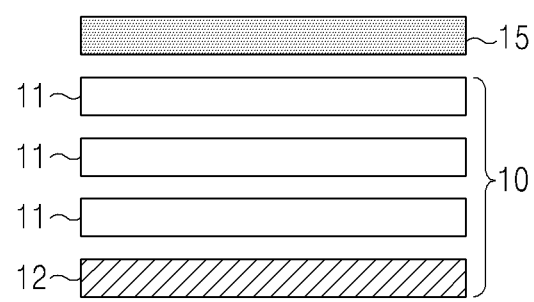
FIGS. 10, 11, 12, 13, and 14 illustrate a stacked structure of fiber-reinforced plastic materials according to various embodiments of the present disclosure.
Figure 11:
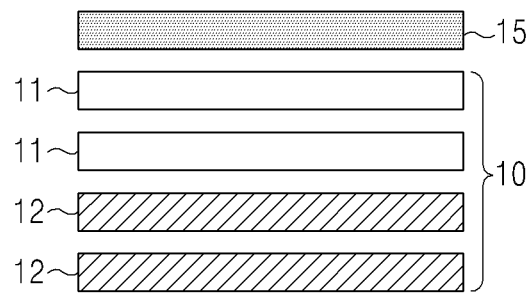
Figure 12:
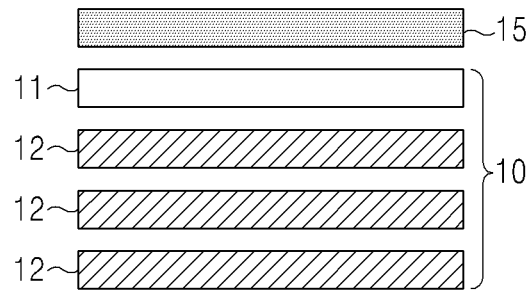
Figure 13:
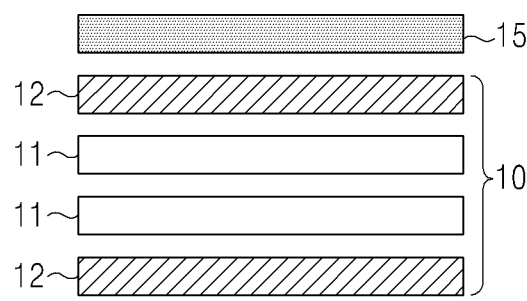
Figure 14:
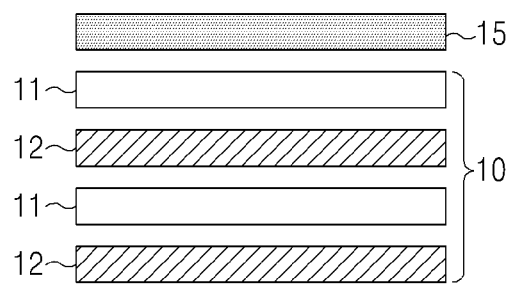

FIG. 8 illustrates an example of temperature distribution on a back surface of a general electronic device when the electronic device operates according to various embodiments of the present disclosure. FIG. 9 illustrates an example of temperature distribution on a back surface of an electronic device when an electronic device including a fiber-reinforced plastic material operates, according to various embodiments of the present disclosure. For example, FIG. 9 illustrates an example of an electronic device 100 including a fiber-reinforced plastic material such as one of the aforementioned prepregs 11 (e.g., prepregs 11a, 11b, and 11c respectively of FIGS. 2, 4, and 6), when the electronic device 100 operates.

Referring to FIGS. 8 and 9, measurement of temperature distribution of each of the electronic device 1 and the electronic device 100 having the same specifications and settings when the electronic device 1 and the electronic device 100 perform the same operation is illustrated. As illustrated in FIG. 8, when the general electronic device 1 operates, a hot spot T1 at 42.3° C. is formed in an upper side of the back surface of the electronic device 1. As illustrated in FIG. 9, when the electronic device 100 including one of the aforementioned prepregs (e.g., prepregs 11a, 11b, and 11c respectively of FIGS. 2, 4, and 6) operates, a hot spot T2 at 40.5° C. is formed in an upper side of the back surface of the electronic device 100. Moreover, comparing FIG. 8 with FIG. 9, the hot spot T2 formed in the electronic device 100 including one of the aforementioned prepregs is distributed over a larger area at low temperature than the hot spot T1 formed in the general electronic device 1. Accordingly, by including one of the aforementioned prepregs, the electronic device 100 may quickly spread and emit heat generated from the emitter.

As illustrated in FIG. 9, for an electronic device having a longer length in a vertical direction than in a horizontal direction, spreading and emitting the generated heat in the vertical direction may be more effective. As mentioned above, the fiber-reinforced plastic material according to various embodiments of the present disclosure may adjust a direction in which the heat is spread and emitted, by using at least one of a material and a weave structure of yarns. For example, if the heat is spread and emitted faster in the direction in which the first yarns 2 extend by using at least one of a material and a weave structure, the fiber-reinforced plastic material included in the electronic device 100, for example, the prepreg 11 may be woven in which the first yarns 2 extend in the vertical direction in FIG. 9. According to various embodiments of the present disclosure, the prepreg included in the electronic device 100 may have a unidirectional weave structure in which yarns extend only in the vertical direction of the electronic device 100.

Figure 15:
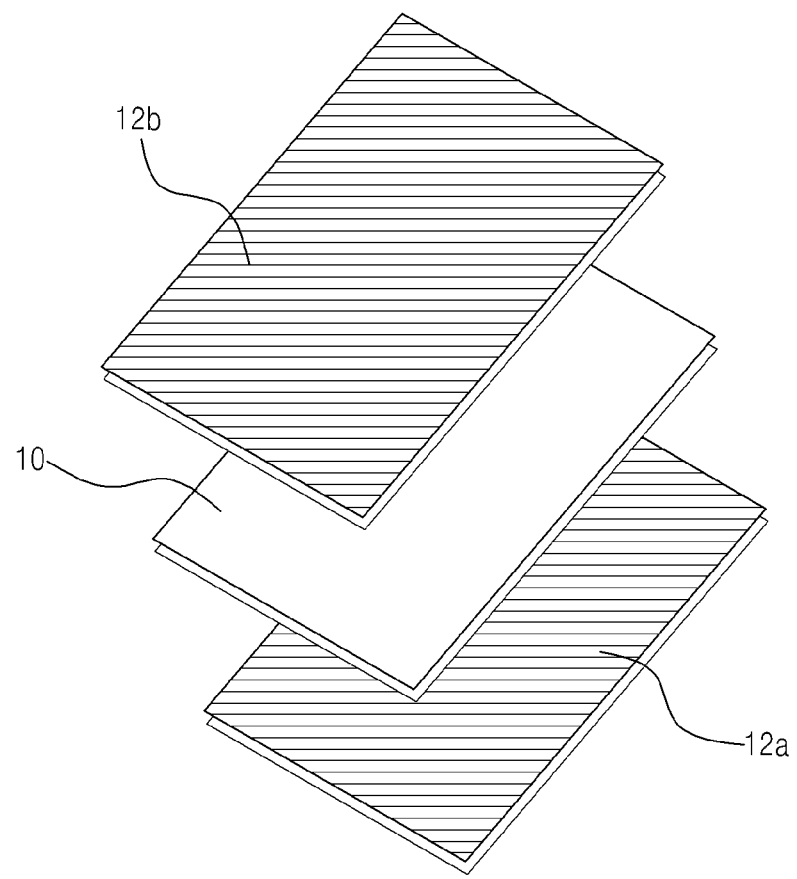
FIG. 15 is a perspective view illustrating a stacked structure of a fiber-reinforced plastic material according to various embodiments of the present disclosure.

FIGS. 10, 11, 12, 13, and 14 illustrate stacked structures of a fiber-reinforced plastic material according to various embodiments of the present disclosure. FIG. 15 is a perspective view illustrating a stacked structure of a fiber-reinforced plastic material according to various embodiments of the present disclosure. For example, FIG. 15 illustrates a cover member of an electronic device including the fiber-reinforced plastic material 10 according to various embodiments of the present disclosure.

Referring to FIGS. 10, 11, 12, 13, and 14, the illustrated fiber-reinforced plastic material 10 may include at least one of the aforementioned prepregs 11 (e.g., prepregs 11a, 11b, and 11c respectively of FIGS. 2, 4, and 6), for example, thermally conductive prepregs, and at least one sub-prepreg 12. When the fiber-reinforced plastic material 10 is structured, at least one of the aforementioned prepregs 11 according to various embodiments of the present disclosure may be used.

According to various embodiments of the present disclosure, the sub-prepreg 12 may be used to reinforce the strength of the fiber-reinforced plastic material 10 or decorate the exterior of the fiber-reinforced plastic material 10. When the aforementioned prepregs 11 are manufactured to have a material and a weave structure considering thermal conductivity, for example, to have a unidirectional weave structure, a crack or separation may occur.

According to various embodiments of the present disclosure, the sub-prepreg 12 may be arranged in a direction that is different from the yarns of the aforementioned prepregs 11, or may be woven to have at least partially different patterns. By stacking the sub-prepreg 12 with the prepregs 11 having thermal conductivity, structural weak points corresponding to arrangement of yarns may be reinforced. According to a weave structure of the sub-prepreg 12, various patterns which are different from the aforementioned prepregs 11 may be formed, such that by disposing the sub-prepreg 12 on an outer surface of the fiber-reinforced plastic material 10, a decoration effect may be provided.

According to various embodiments of the present disclosure, when the fiber-reinforced plastic material 10 is structured, the number of prepregs 11 having thermal conductivity and the number of sub-prepregs 12 may be variously disposed, taking account of a heat-emission effect, a structural strength, and exterior decoration. A stacking order of the prepregs 11 having thermal conductivity and the sub-prepreg 12 may also be variously changed. However, the heat-conductivity prepreg 11, for example, the unidirectional weave structure prepreg having thermal conductivity is disposed most closely to a heat emitter 15, for example, a heat-emission electronic circuit device, thus improving the efficiency of heat radiation.

Referring to FIG. 15, when the fiber-reinforced plastic material 10 is used as a part of an electronic device, resin layers 12a and 12b may be formed on both surfaces of the fiber-reinforced plastic material 10. For example, a structure that may be bound to another part of the electronic device may be formed in the first resin layer 12a disposed on an inner side of the fiber-reinforced plastic material 10, and painting, coating, or exterior shape formation may be performed in the second resin layer 12b disposed on an outer side of the fiber-reinforced plastic material 10, thus making the exterior elegant.

Figure 16:
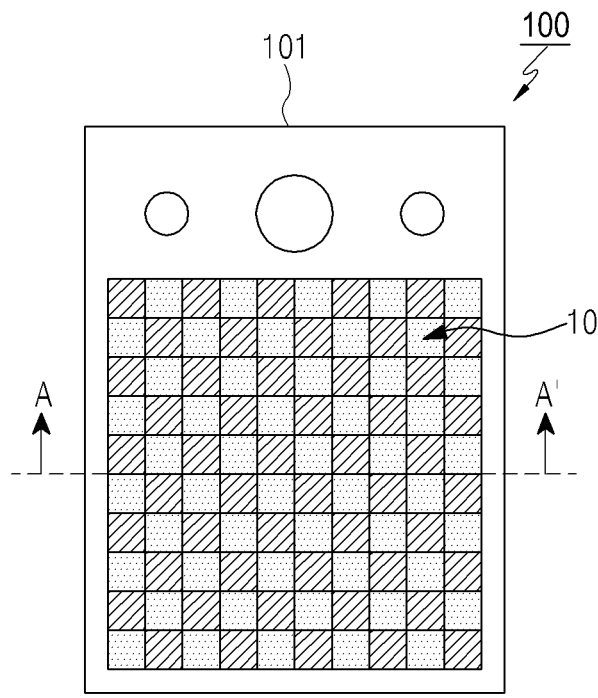
FIG. 16 is a floor plan illustrating an electronic device including a fiber-reinforced plastic material according to various embodiments of the present disclosure.
Figure 17:
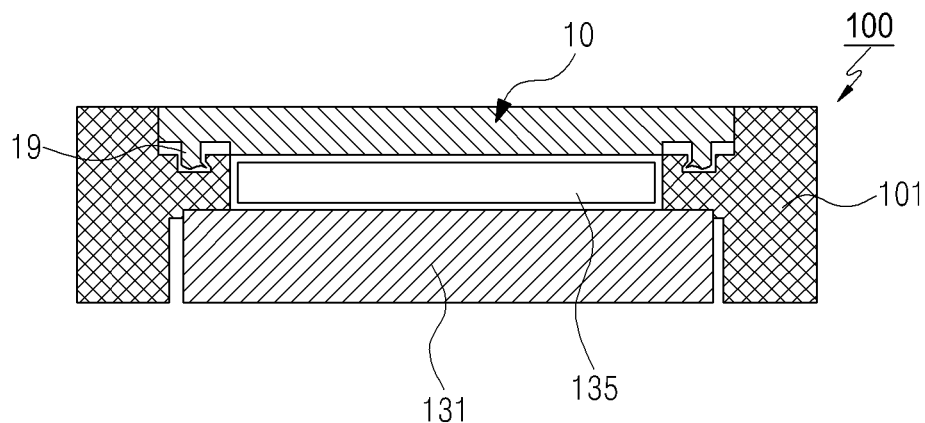
FIG. 17 is a cross-sectional view of an electronic device such as, for example, the electronic device of FIG. 16 cut along a line A-A' according to various embodiments of the present disclosure.
Figure 18:
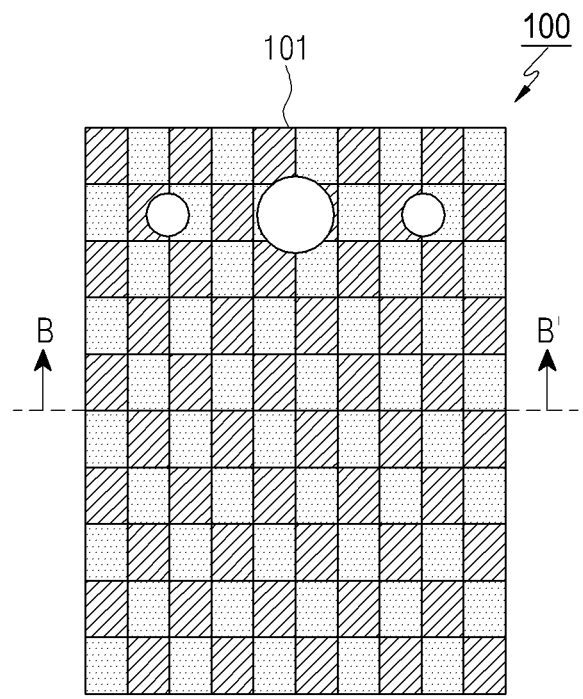
FIG. 18 is a floor plan illustrating a modified example of an electronic device including a fiber-reinforced plastic material according to various embodiments of the present disclosure.
Figure 19:
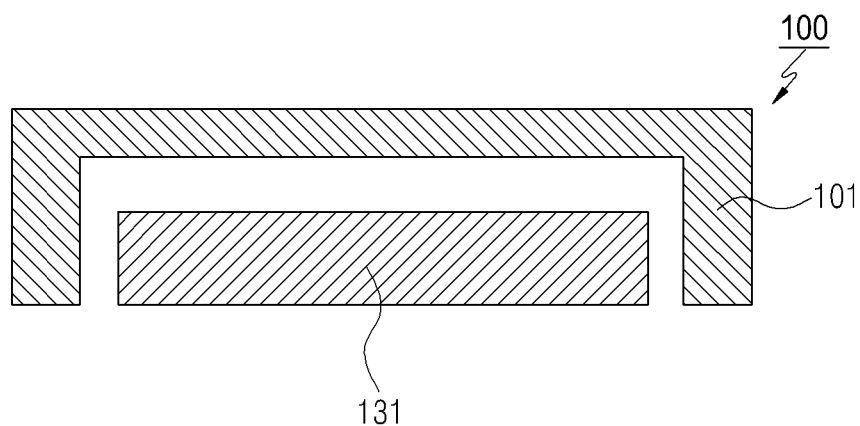
FIG. 19 is a cross-sectional view of an electronic device such as, for example, the electronic device of FIG. 18 cut along a line B-B' according to various embodiments of the present disclosure.

FIG. 16 is a floor plan of an electronic device including a fiber-reinforced plastic material according to various embodiments of the present disclosure. FIG. 17 is a cross-sectional view of an electronic device such as, for example, the electronic device of FIG. 16 cut along a line A-A' according to various embodiments of the present disclosure. FIG. 18 is a floor plan of a modified example of an electronic device including a fiber-reinforced plastic material according to various embodiments of the present disclosure. FIG. 19 is a cross-sectional view of an electronic device such as, for example, the electronic device of FIG. 18 cut along a line B-B' according to various embodiments of the present disclosure.

Referring to FIGS. 16, 17, 18, and 19, the electronic device 100 may form a cover member including the fiber-reinforced plastic material 10. Herein, the 'cover member' may include a front case and a rear case of a main body of the electronic device 100, a battery cover provided removable from the main body, and a frame for implementing a decoration effect.

FIGS. 16 and 17 illustrate a structure in which the fiber-reinforced plastic material 10 is manufactured as a cover member assembled to or provided removable from a main body 101 of the electronic device 100, for example, as a battery cover. The fiber-reinforced plastic material 10 provided as an assembled or removable cover member may be adhered to the main body 101 or may include a binding member such as a hook 19.

FIGS. 18 and 19 illustrate a structure in which the main body 101 of the electronic device 100 is manufactured as the fiber-reinforced plastic material 10. The fiber-reinforced plastic material 10 may be formed in various shapes during stacking and compressing the prepregs 11 and 12, such that the main body 101 may be formed of the fiber-reinforced plastic material 10.

The fiber-reinforced plastic material 10 may be provided to improve a heat-emission effect. For example, disposing the fiber-reinforced plastic material 10 adjacent to the emitter installed in the electronic device 100, for example, a heat-emission electronic circuit device 131, may improve a heat radiation effect. In addition, disposing a thermal interface member 135 between the electronic circuit device 131 and the fiber-reinforced plastic material 10, may further improve heat transfer efficiency. The thermal interface member 135 may be provided in the form of a film or may be formed of a viscous material such as thermal grease.

According to various embodiments of the present disclosure, the cover member of the electronic device is made using the fiber-reinforced plastic material, and a material or a weave structure of some of yarns of the fiber-reinforced plastic material may be used to effectively spread and emit heat generated in the electronic device.

Figure 20:
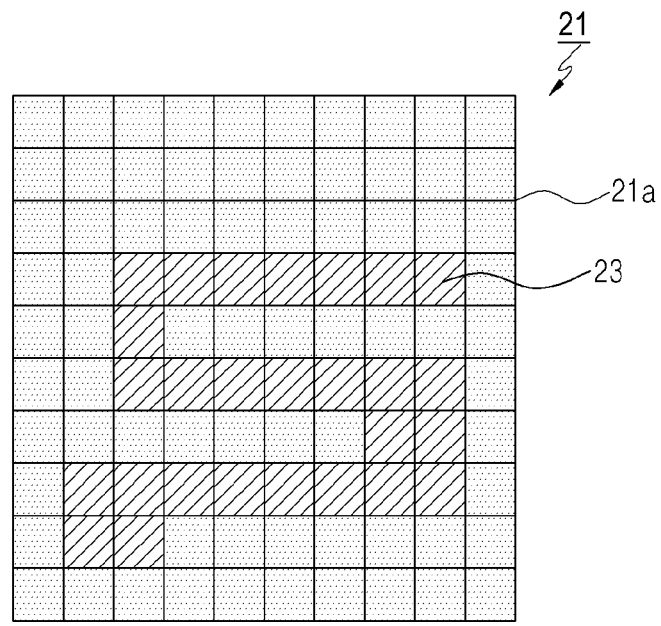
FIG. 20 illustrates a portion of a fiber-reinforced plastic material according to various embodiments of the present disclosure.
Figure 21:
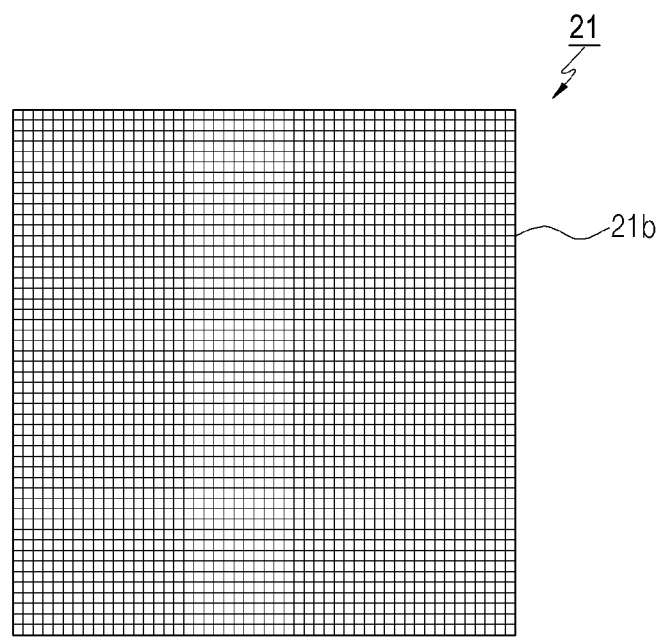
FIG. 21 illustrates a portion of a fiber-reinforced plastic material according to various embodiments of the present disclosure.
Figure 22:
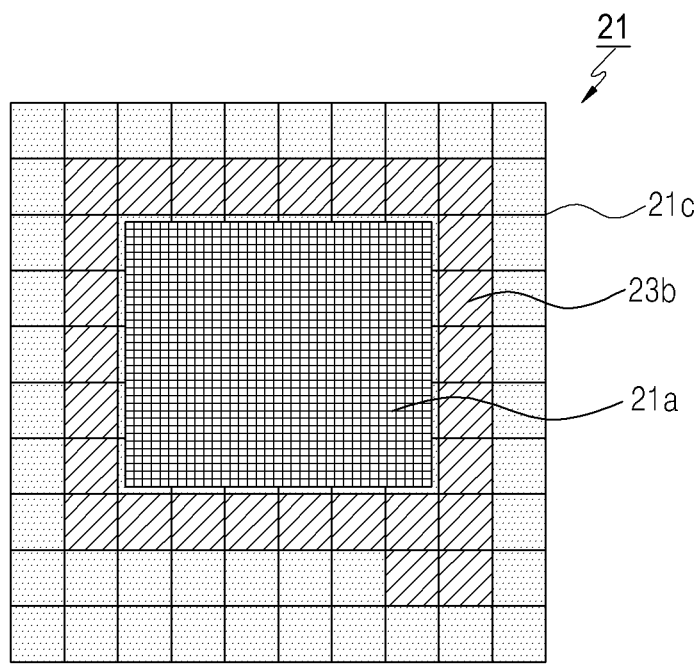
FIG. 22 illustrates a portion of a fiber-reinforced plastic material according to various embodiments of the present disclosure.

FIG. 20 illustrates a portion of a fiber-reinforced plastic material according to various embodiments of the present disclosure, FIG. 21 illustrates a portion of a fiber-reinforced plastic material according to various embodiments of the present disclosure, and FIG. 22 illustrates a portion of a fiber-reinforced plastic material according to various embodiments of the present disclosure.

Referring to FIGS. 20, 21, and 22, according to various embodiments of the present disclosure, in fiber-reinforced plastic materials a portion of prepregs 21 or some of yarns of the prepregs 21 may have different physical properties, for example, dielectric constants. For example, the prepregs 21 each may have a region formed of an electrically conductive material, or electrically conductive yarns may be arranged to have a pattern, for example, a grid pattern. The prepregs 21 that includes a conducting portion having a conductor or has a grid pattern may form a radiator or a grounding conductor of an antenna device or a touch panel.

As illustrated in FIG. 20, a prepreg has a portion 23 that is a conductor. As will be described below, the portion 23 of the prepreg 21a, which is a conductor, may be used as a radiator or a grounding conductor, and may also be formed to have a pattern of various shapes.

As illustrated in FIG. 21, in a prepreg 21b, yarns made of an electrically conductive material are woven to form a grid pattern. The prepreg 21b may be used as a touch panel by connecting a signal line to the respective yarns. In addition, by disposing a touch panel, for example, an Indium-Tin Oxide (ITO) film on a surface of the prepreg 21b, the fiber-reinforced plastic material may be configured as the touch panel.

As illustrated in FIG. 22, according to various embodiments of the present disclosure, a prepreg 21c of the fiber-reinforced plastic material may have a portion formed of the prepreg 21a that may form a touch panel, and also may have a conductor portion 23b. In this case, the fiber-reinforced plastic material including the prepreg 21c is used as a radiator or a grounding conductor and may also be used an input device, for example, a touch panel.

Figure 23:
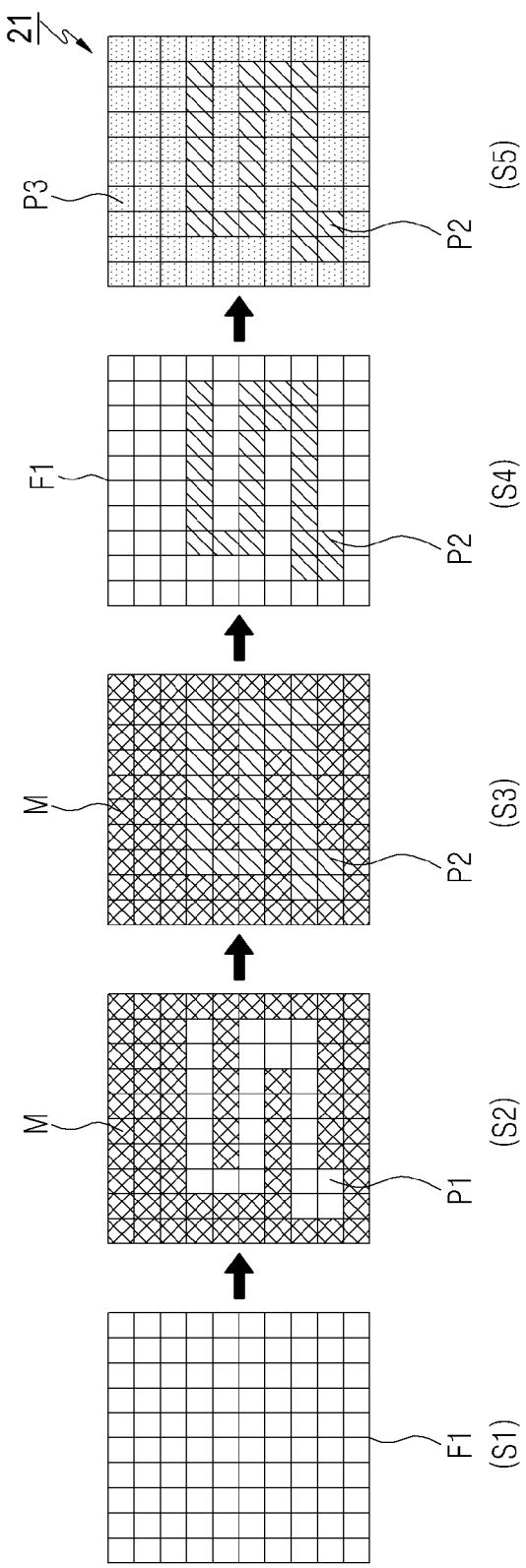
FIG. 23 is a diagram for describing a process of manufacturing a fiber-reinforced plastic material according to various embodiments of the present disclosure.

FIG. 23 is a diagram for describing a process of manufacturing a fiber-reinforced plastic material according to various embodiments of the present disclosure. The process of manufacturing the fiber-reinforced plastic material according to various embodiments of the present disclosure will be described with further reference to the prepreg 21 of the fiber-reinforced plastic material illustrated in FIG. 20.

According to various embodiments of the present disclosure the yarns of the prepreg 21 may be made of a non-conductive material. According to various embodiments of the present disclosure, some yarns may also be manufactured with an electrically conductive material. However, the process of manufacturing the prepreg 21 disclosed in FIG. 23 may show an example of a structure in which the yarns of the prepreg 21 are made of a non-conductive material.

Referring to FIG. 23, at operation S1, a preform F1 of the prepreg 21 may be manufactured by weaving yarns. The preform F1 may be manufactured to have a unidirectional, plain, twill structure or a different shape of a weave structure.

Once the preform F1 is completed at operation S1, at operation S2, a mask M having a desired pattern may be formed on the surface of the preform F1. For example, the mask M may be formed on the surface of the preform F1 in a state in which a portion P1 is removed according to design position and pattern. In the portion P1 in which the mask M is removed, the preform F1 is exposed, and in the other portion, the preform M1 may be covered by the mask M.

Thereafter, at operation S3, by applying electrically conductive ink using printing such as silkscreen or by using dipping or deposition, a printing layer may be formed on the preform F1 or a membrane P2 may be formed on the surface of yarns in a region in which the mask M is removed. The printing layer or the membrane P2 may be made of an electrically conductive material or a thermally conductive material.

After the printing layer or the membrane P2 is completed at operation S3, at operation S4, the mask M is removed.

At operation S5, a resin layer P3 is dipped or deposited in the other region of the preform F1 such that the prepreg 21 is completed. A pattern formed by the printing layer or the membrane P2 may be set variously according to a design condition, for example, desired radiation characteristics.

FIGS. 24, 25, 26, 27, and 28 illustrate various stacked structures of fiber-reinforced plastic materials according to various embodiments of the present disclosure.

According to various embodiments of the present disclosure, a portion of each of the fiber-reinforced plastic materials 20 may include at least one prepreg 21 made of an electrically conductive material and at least one sub-prepreg 22.

Figure 24:
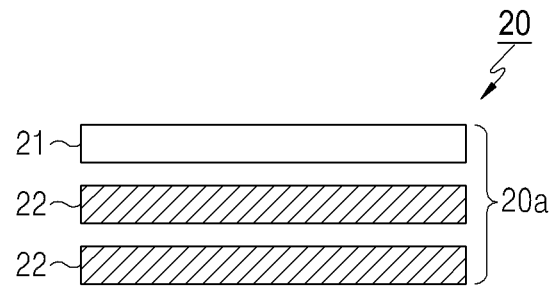
FIGS. 24, 25, 26, 27, and 28 illustrate stacked structures of fiber-reinforced plastic materials according to various embodiments of the present disclosure.
Figure 25:
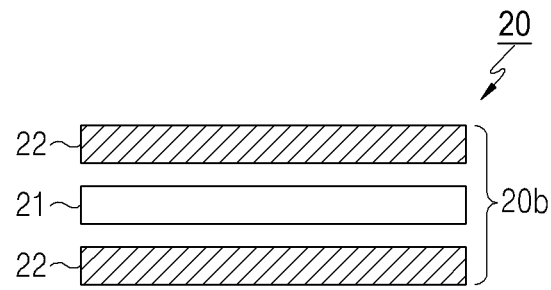

Referring to FIGS. 24 and 25, fiber-reinforced plastic materials 20a and 20b in which a prepreg 21 having a portion is made of an electrically conductive material and for which a plurality of sub-prepregs 22 are stacked, are illustrated. The respective sub-prepregs 22 may provide patterns that reinforce the structural strength of the fiber-reinforced plastic materials 20a and 20b or make the exterior of the fiber-reinforced plastic materials 20a and 20b elegant. For example, yarns of the sub-prepregs 22 are arranged or extend in a direction that is different from yarns of the prepreg 21, or may have an at least partially different pattern, thus improving the strength and exterior of the fiber-reinforced plastic materials 20a and 20b.

Figure 26:
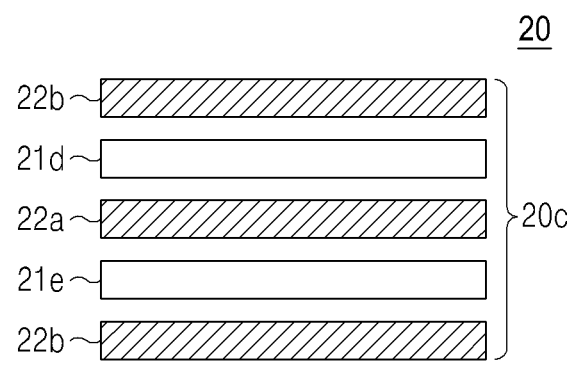
Figure 27:
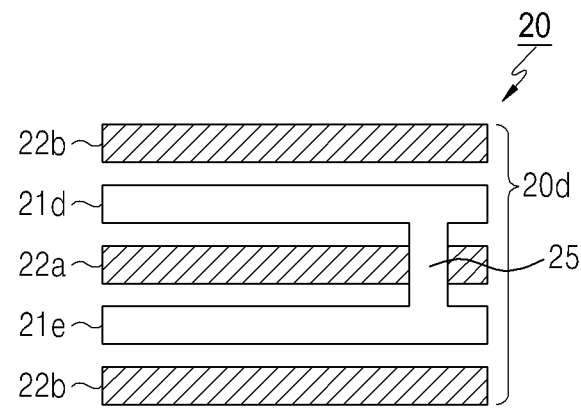
Figure 28:
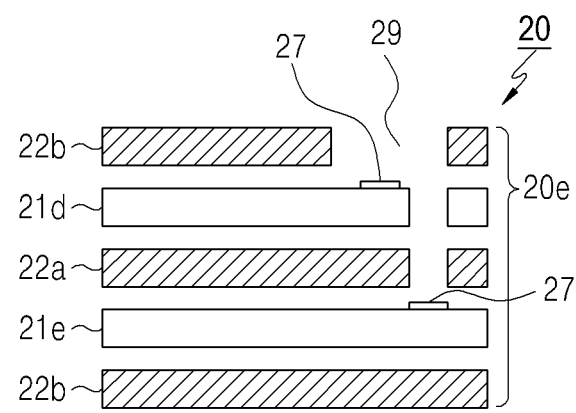

Referring to FIGS. 26, 27, and 28, fiber-reinforced plastic materials 20c, 20d, and 20e which include a plurality of prepregs 21d and 21e whose portions 23 are made of an electrically conductive material, and include a plurality of sub-prepregs 22a and 22b. According to various embodiments of the present disclosure, the first and second prepregs 21d and 21e which are partially made of an electrically conductive material may be prepregs such as the prepregs illustrated in FIGS. 20 through 22. The sub-prepregs 22a and 22b may include a third prepreg 22a which is interposed between the first prepreg 21d and the second prepreg 21e to provide a function of an insulating layer. Moreover, by stacking fourth prepregs 22b provided as sub-prepregs on the surface, for example, a top side and a bottom side, the strength and exterior of the fiber-reinforced plastic materials 20c, 20d, and 20e may be improved.

Referring to FIG. 27, according to various embodiments of the present disclosure, the fiber-reinforced plastic material 20d may include a connection member 25 passing through the third prepreg 22a. The connection member 25 may electrically couple conductor portions formed in the first and second prepregs 21d and 21e. The connection member 25 may be a via hole passing through the third prepreg 22a or a metallic layer filled in the hole. Moreover, a portion of the third prepreg 22a may be formed of an electrically conductive material. If the portion of the third prepreg 22a is formed of the conductor, the conductor portions formed in the first prepreg 21d and the second prepreg 21e may be electrically coupled to each other through the conductor portion of the third prepreg 22a. If the conductor portions formed in the first prepreg 21d and the second prepreg 21e are electrically coupled with each other through the connection member 25, radiation efficiency may be improved by using the conductor portions as radiators.

Referring to FIG. 28, to connect the conductor portions of the first prepreg 21d and the second prepreg 21e to another circuit device, for example, a transmission/reception circuit module or a ground portion provided in a circuit board, the fiber-reinforced plastic material 20e may include an opening 29. Through the opening 29, the conductor portions, for example, radiators or grounding conductors, of the first and second prepregs 21d and 21e, may be partially exposed to the outside of the fiber-reinforced plastic material 20e. The exposed portions of the conductor portions of the first and second prepregs 21d and 21e may provide a physical contact region for connection to another circuit device. According to various embodiments of the present disclosure, a connection pad 27 may be further provided in the exposed portions of the conductor portions of the first and second prepregs 21d and 21e. The connection pad 27 may also be exposed to the outside of the fiber-reinforced plastic material 20e through the opening 29.

Figure 29:
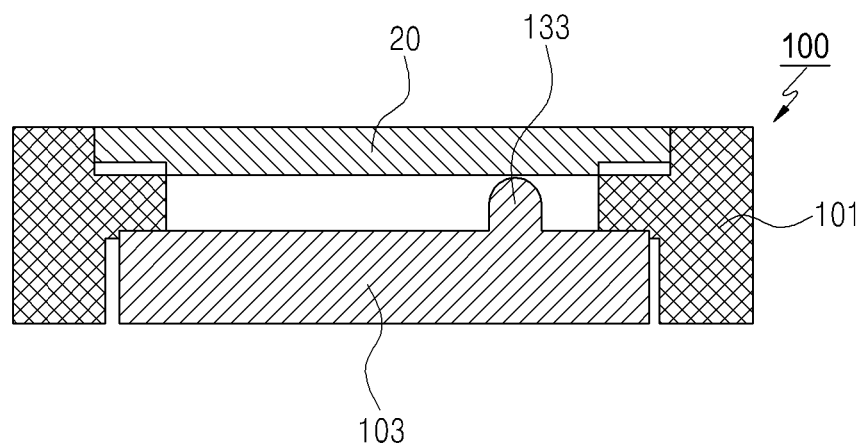
FIG. 29 is a cross-sectional view of an electronic device including a fiber-reinforced plastic material according to various embodiments of the present disclosure.

FIG. 29 is a cross-sectional view of the electronic device including a fiber-reinforced plastic material according to various embodiments of the present disclosure.

Referring to FIG. 29, the electronic device 100 may have a structure in which the fiber-reinforced plastic material 20 is used for a cover member assembled to or removably provided in the main body 101 of the electronic device 100, for example, a battery cover. The fiber-reinforced plastic material 20 provided as a cover member assembled or provided removably may be adhered to the main body 101 or may include an engagement member such as a hook.

Figure 30:
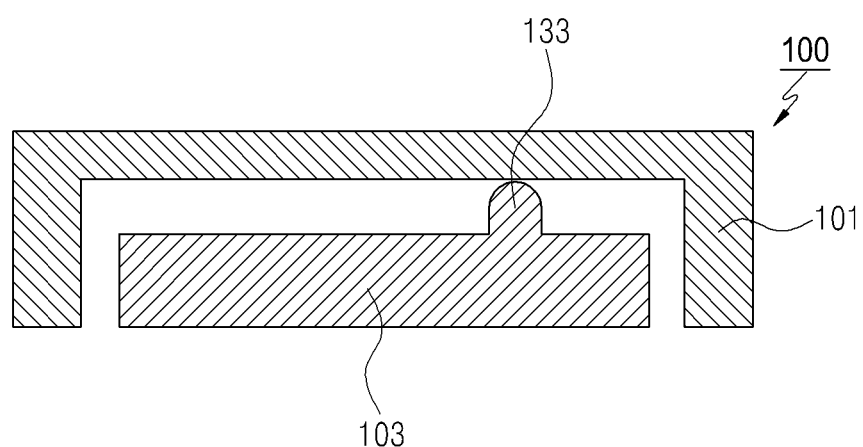
FIG. 30 is a cross-sectional view of an example of an electronic device including a fiber-reinforced plastic material according to various embodiments of the present disclosure.

FIG. 30 is a cross-sectional view of an example of an electronic device including a fiber-reinforced plastic material according to various embodiments of the present disclosure.

Referring to FIG. 30, the electronic device 100 may have a structure in which the main body 101 is made of the fiber-reinforced plastic material 20. During deposition and compression of the prepregs, the fiber-reinforced plastic material 20 may be formed in various shapes, such that the main body 101 may be made of the fiber-reinforced plastic material 20.

By including a connection terminal 133, the electronic device 100 may electrically connect a portion of the main body 101 or the fiber-reinforced plastic material 20, for example, the conductor portions of the first and second prepregs 21d and 21e with circuit devices included in the electronic device 100. The connection terminal 133 may use a terminal member in various shapes such as a C clip, a pogo pin, or a leaf spring.

According to various embodiments of the present disclosure, fiber-reinforced plastic materials may be used as a cover member of an electronic device, for example, front/rear cases, a battery cover, or a frame. A fiber-reinforced plastic material having thermal conductivity may be used for the front/rear cases or the battery cover of the electronic device. The fiber-reinforced plastic material including an electrically conductive portion may also be used for the front/rear cases, the battery cover, or the frame. If the front/rear cases of the electronic device are manufactured with the fiber-reinforced plastic material including the conductor portion, then a grounding portion connected to circuit devices of the electronic device may be provided by using the conductor portion of the fiber-reinforced plastic material. It should be noted that in the following description, for brevity, reference numerals for the prepregs or the fiber-reinforced plastic materials in the drawings may be omitted or only some of them may be provided.

Figure 31:
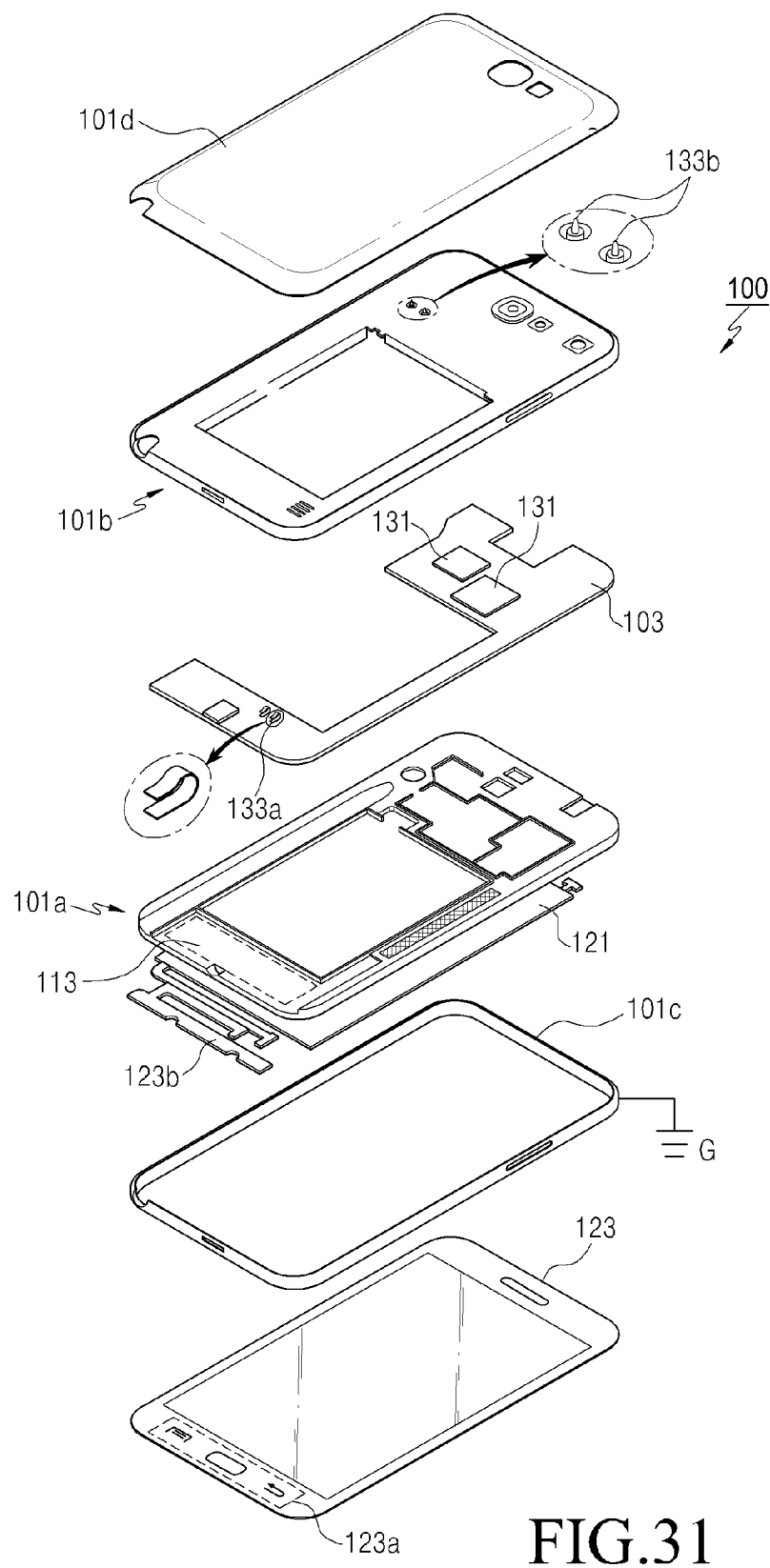
FIG. 31 is an exploded perspective view of an electronic device including a fiber-reinforced plastic material according to various embodiments of the present disclosure.
Figure 32:
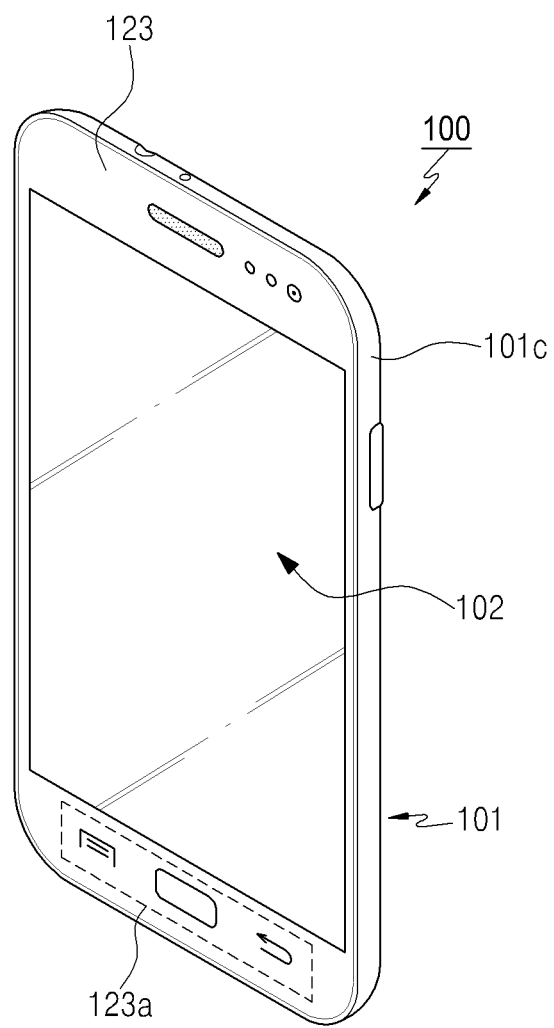
FIG. 32 is a perspective view of an electronic device including a fiber-reinforced plastic material according to various embodiments of the present disclosure.

FIG. 31 is an exploded perspective view of an electronic device including a fiber-reinforced plastic material according to various embodiments of the present disclosure. FIG. 32 is a perspective view of an electronic device including a fiber-reinforced plastic material according to various embodiments of the present disclosure.

Referring to FIGS. 31 and 32, the electronic device 100 may include a front case 101a, a rear case 101b, a display 102, a circuit board 103, and a frame 101c for concealing a boundary formed by coupling between the front case 101a and the rear case 101b. In an embodiment, if a battery pack is provided removably, then the electronic device 100 may include a battery cover 101d for concealing and protecting the battery pack.

In the electronic device 100, the front case 101a and the rear case 101b are coupled to face each other, thus forming the main body 101, and the circuit board 103 is received in an inner space of the main body 101. The display 102 including a window member 123 and a display module 121 is installed on a surface of the main body 101. The display module 121 may be interposed between the front case 101a and the window member 123. For example, the front case 101a is coupled with the rear case 101b to form the main body 101 and may also be used as a bracket for supporting the display module 121. On the circuit board 103 may be mounted multiple electronic circuit devices 131 such as an application processor on which various control algorithms are mounted and a chip module on which codec for playing a multimedia file such as video/music is mounted. If the electronic device 100 has a communication function, for example, commercialized mobile communication, wireless Local Area Network (LAN), Near Field Communication (NFC), and the like, or wireless charging, then a transmission/reception circuit module for performing such a communication function, for example, a communication module may be mounted on the circuit board 103.

The electronic device 100 may include a keypad region 123a assigned to a side region of the window member 123. In the keypad region 123a, physical buttons or keys configured using a capacitive or resistive touch panel may be disposed. In the front case 101a, a key sheet 123b may be disposed corresponding to the keypad region 123a. If the physical buttons are disposed in the keypad region 123a, the key sheet 123b may include a physical switch member such as a dome switch. If the keypad region 123a forms a capacitive or resistive touch panel, the key sheet 123b may include a touch sensor such as an Indium Tin Oxide (ITO) film.

The battery cover 101d may be provided removably from the other surface of the main body 101. If an NFC function or a wireless charging function is provided in the electronic device 100, a radiator or an induction coil of an antenna device for the function may be installed in the battery cover 101d. As mentioned previously, according to various embodiments of the present disclosure, the cover members, for example, the front/rear cases 101a and 101b, the frame 101c, and the battery cover 101d may be made of the fiber-reinforced plastic materials 10 and 20.

The front/rear cases 101a and 101b provided to directly cover the circuit board 103 may be configured to improve radiation performance. For example, the front/rear cases 101a and 101b may be made of a material for improving radiation efficiency by using at least one of materials and weave structures of yarns for the fiber-reinforced plastic materials 10 and 20 according to various embodiments of the present disclosure. In FIG. 31, the electronic circuit devices 131 mounted on the circuit board 103 face the rear case 101b.

If the rear case 101b is manufactured with the fiber-reinforced plastic material 10 including at least one thermally conductive prepreg 11, then heat generated from the electronic circuit devices 131 may be spread and emitted through the rear case 101b. In order to spread (e.g., dissipate) heat faster in a longitudinal direction of the electronic device 100, the battery cover 101d may be manufactured such that thermally conductive yarns of the rear case 101b are disposed in a longitudinal direction of the electronic device 100. In order to spread (e.g., dissipate) heat faster in the longitudinal direction of the electronic device 100, the yarns arranged in the longitudinal direction of the electronic device 100 may be disposed closer to the electronic circuit devices 131. For example, in a region adjacent to the electronic circuit devices 131, the yarns arranged in the longitudinal direction of the electronic device 100 may be positioned in an inner side of the rear case 101b. A weave structure in which some yarns are positioned in a side of a prepreg or a fiber-reinforced plastic material in a predetermined region has already been described in the embodiment illustrated in FIGS. 6 and 7. The thermal interface member 135 is interposed between the electronic circuit devices 131 and the rear case 101b, for example, the fiber-reinforced plastic material 10 including the thermally conductive prepreg 11, thus quickly transferring the generated heat to the rear case 101b.

A cover member manufactured with the fiber-reinforced plastic material 20 including a conductor portion will be described by using the battery cover 101d as an example. As stated above, in the battery cover 101d, a radiator of an NFC antenna device and an induction coil for wireless charging may be disposed, and according to various embodiments of the present disclosure, a radiator of an antenna device may be disposed in at least a portion of an electronic device using an antenna for, such as mobile communication or WLAN. Because the fiber-reinforced plastic material 20 forming the battery cover 101d includes a conductor portion, the conductor portion may be used as a radiator of the antenna devices. Moreover, if the rear case 101b is manufactured with the fiber-reinforced plastic material 20 including the conductor portion, the conductor portion in the rear case 101b may also be used as a radiator of the antenna device.

According to various embodiments of the present disclosure, in order to use the conductor portions provided in the cover members as radiators, the conductor portion of the fiber-reinforced plastic material 20 may be connected to a transmission/reception circuit module provided in the circuit board 103. For example, various forms of connection terminals 133, for example, a C clip 133a or a pogo pin 133b may be provided. The connection terminals 133 may contact the conductor portion of the fiber-reinforced plastic material 20 or the connection pad 27 provided on the conductor portion through an opening formed in the battery cover 101d, for example, the opening 29 illustrated in FIG. 28. In the structure illustrated in FIG. 31, a portion of a fiber-reinforced plastic material forming the rear case 101b is provided as a conductor and thus may be connected to the transmission/reception circuit module through the C clip 133a. The conductor provided in the rear case 101b may be used as, for example, a radiator for providing wireless communication in a commercialized mobile communication network. According to various embodiments of the present disclosure, a portion of the fiber-reinforced plastic material forming the battery cover 101d may be provided as a conductor. The conductor provided in the battery cover 101d may be used as a radiator of an antenna device for NFC or wireless charging. The conductor provided in the battery cover 101d may be connected to the transmission/reception circuit module provided in the circuit board 103 through the connection terminal such as the pogo pin 133b installed in the rear case 101b. Herein, the transmission/reception circuit module provided in the circuit board 103 may include a charging circuit module as well as a circuit for wireless communication. For example, the conductor provided in the rear case 101b may be used as a secondary coil for wireless charging. If the conductor is used as the secondary coil for wireless charging, the conductor provided in the rear case 101b may be connected to the charging circuit module provided in the circuit board 103 through the pogo pin 133b.

The frame 101c may be configured using the fiber-reinforced plastic material 20 including the conductor portion. The frame 101c may be mounted to enclose at least a portion of the main body 101, for example, at least a portion of a circumference of at least the display device 102. The conductor portion included in the frame 101c may include a regular or irregular pattern form or an electrically conductive portion in which yarns of a conductor material are arranged in a grid form. Generally, when two objects approach each other, an electro-static discharge phenomenon may occur according to a peripheral environment. Such an electro-static phenomenon generated in an electronic device may damage a storage medium or circuit devices, for example, electronic circuit devices or a display module. If the fiber-reinforced plastic material 20 forming the frame 101c may include a conductor portion or include a conductor in at least a portion thereof, the conductor portion or the conductor may be connected to a grounding portion G provided in the electronic device for use as a grounding conductor. The grounding portion G of the electronic device 100 may be disposed on the circuit board 103 or the surface, for example, an inner side, of the front/rear cases 101a and 101 b.

As mentioned previously, by using the fiber-reinforced plastic material 20 according to various embodiments of the present disclosure, the touch pad may be implemented. According to various embodiments of the present disclosure, a portion of the front case 101a illustrated in FIG. 31 may be implemented as a touch pad. For example, the key sheet 123b corresponding to the keypad region 123a is disposed on the front case 101a, and a portion of the front case 101a is implemented as a touch pad by using the fiber-reinforced plastic material 20 according to various embodiments of the present disclosure, thus substituting for the key sheet 123b. The front case 101a provides a structure corresponding to a bezel region of the window member 123 while supporting the display module 121. For example, an inner side and an edge of the window member 123 are attached to the front case 101a. Moreover, in a portion (hereinafter, referred to as a 'touch pad region') 113 corresponding to the keypad region 123a, at least some of the yarns of the fiber-reinforced plastic material 20 form a pattern, and for example, are arranged to form a grid pattern, such that a portion of the front case 101a may be implemented as a touch pad. Thus, the electronic device 100 manufactures the front case 101a with the fiber-reinforced plastic material 20 according to various embodiments of the present disclosure, without disposing the separate key sheet 123b, such that a portion of the front case 101a may be implemented as a touch pad.

The touch pad using the cover member may also be implemented using the frame 101c. For example, in at least a portion of the frame 101c, yarns of an electrically conductive material may be arranged in a pattern, for example, a grid pattern. The touch pad implemented in the frame 101c may be used to execute various operations performed in a general touch screen display device, such as a screen scroll operation, a touch/tap operation, and a pinch zoom-in/zoom-out operation.

The foregoing description has been made in an example in which a fiber-reinforced plastic material according to various embodiments of the present disclosure is applied to a bar-shape electronic device, but the fiber-reinforced plastic material according to various embodiments of the present disclosure may also be applied to an electronic device or in any other shape or an additional device provided in the electronic device. An example of electronic devices in other shapes including a fiber-reinforced plastic material according to various embodiments of the present disclosure may be a wearable device that may be worn on a wrist, an ear, or a face. The wearable device is to be worn, and thus needs to be reduced in size and weight when compared to a general portable electronic device. Thus, in the wearable devices, a space for disposing input/output devices may be significantly limited. By using the fiber-reinforced plastic material according to various embodiments of the present disclosure, a cover member and a touch pad of the wearable device may be implemented at the same time.

The fiber-reinforced plastic material according to various embodiments of the present disclosure may spread and emit heat in a designed direction by using at least one of a material and a weave structure of yarns. Therefore, heat emission performance of an electronic device, for example, a mobile communication electronic device that is used while being carried, may be improved. Moreover, if the fiber-reinforced plastic material is partially, or some of yarns of the fiber-reinforced plastic material are formed of an electrically conductive material, a radiator of an antenna device or a touch panel may be configured in the fiber-reinforced plastic material. By manufacturing an electronic device, for example, a mobile communication electronic device, or a wearable device that is worn on a human body such as a wrist, an ear, or a face with the fiber-reinforced plastic material, a radiator or a touch panel may be formed without securing a separate space, thus contributing to miniaturization of the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a transmission/reception circuit module;
a fiber-reinforced plastic material, which is woven with a plurality of yarns;
a cover member provided on a surface of a main body of the electronic device and including the fiber-reinforced plastic material; and
a radiator formed in which at least some of the yarns forming the cover member are formed of an electrically conductive material,
wherein a material property of at least a portion of the fiber-reinforced plastic material is different from another portion of the fiber-reinforced plastic material according to at least one of an arrangement direction of the yarns, a weave pattern of the yarns, and a material of the yarns,
wherein the cover member comprises:
a first prepreg that is woven with the yarns and that comprises the radiator,
a second prepreg that is woven with the yarns and that is stacked on the first prepreg,
an opening formed in the second prepreg, the radiator being exposed through the opening, and
a connection pad disposed in a portion of the radiator exposed through the opening,
wherein the radiator is electrically connected to the transmission/reception circuit module, and
wherein the yarns forming the second prepreg are arranged in different directions than the yarns of the first prepreg, or are woven to have different patterns.

2. The electronic device of claim 1, wherein at least some of the yarns forming the cover member are formed of a thermally conductive material.

3. The electronic device of claim 2, further comprising a heat-emission electronic circuit device, wherein the yarns formed of a thermally conductive material are disposed to face the electronic circuit device in an inner side of the cover member.

4. The electronic device of claim 3, further comprising a thermal interface member interposed between the electronic circuit device and the yarns formed of the thermally conductive material.

5. The electronic device of claim 3, wherein the cover member further comprises:
at least one thermally conductive prepreg woven to comprise the yarns formed of the thermally conductive material; and
at least one sub-prepreg comprising yarns that are arranged in different directions than the yarns of the thermally conductive prepreg or that are woven to have at least partially different patterns.

6. The electronic device of claim 5, wherein the thermally conductive prepreg disposed to face the electronic circuit device comprises a unidirectional-woven prepreg.

7. The electronic device of claim 1,
wherein the cover member comprises third prepreg, the first prepreg and the third prepreg being woven with the yarns, and
wherein radiators are formed in the first prepreg and the third prepreg, respectively.

8. The electronic device of claim 7, further comprising a fourth prepreg of an insulating material, which is interposed between the first prepreg and the third prepreg.

9. The electronic device of claim 7,
wherein the cover member further comprises a fourth prepreg interposed between the first prepreg and the third prepreg, and
wherein at least a portion of the fourth prepreg is formed of an electrically conductive material to electrically couple the radiator formed in the first prepreg with the radiator formed in the third prepreg.

10. The electronic device of claim 8,
wherein the cover member further comprises a connection member provided to pass through the fourth prepreg, and
wherein the connection member electrically couples the radiator formed in the first prepreg and the radiator formed in the third prepreg.

11. The electronic device of claim 1, further comprising a connection terminal provided in a main body of the electronic device,
wherein the connection terminal contacts the radiator through the opening to connect the radiator to the transmission/reception circuit module.

12. The electronic device of claim 1,
wherein at least some of the yarns of the first prepreg are formed of an electrically conductive material, and
wherein the yarns formed of the electrically conductive material among yarns forming the first prepreg are arranged in a pattern.

13. The electronic device of claim 1, wherein the cover member is provided removably from a surface of the main body of the electronic device.

14. The electronic device of claim 1, further comprising a display installed in the main body of the electronic device,
wherein the fiber-reinforced plastic material forms a frame mounted in an edge of at least the display and at least some of the yarns forming the frame are formed of an electrically conductive material to form an electrically conductive portion.

15. The electronic device of claim 14, wherein the electrically conductive portion is connected to a grounding portion of the electronic device.

16. An electronic device comprising:
a circuit board;
a transmission/reception circuit module provided on the circuit board; and
a cover member configured to receive the circuit board,
wherein the cover member comprises:
a fiber-reinforced plastic material, which is woven with a plurality of yarns,
a first prepreg that is woven with the yarns and that comprises a radiator,
a second prepreg that is woven with the yarns and that is stacked on the first prepreg,
an opening formed in the second prepreg, the radiator being exposed through the opening, and
a connection pad disposed in a portion of the radiator exposed through the opening,
wherein a material property of at least a portion of the fiber-reinforced plastic material is different from another portion of the fiber-reinforced plastic material according to at least one of an arrangement direction of the yarns, a weave pattern of the yarns, and a material of the yarns,
wherein at least some of the yarns forming the cover member are formed of an electrically conductive material and the yarns formed of the electrically conductive material are electrically connected to the transmission/reception circuit module, and
wherein the yarns forming the second prepreg are arranged in different directions than the yarns of the first prepreg, or are woven to have different patterns.

17. The electronic device of claim 16, further comprising a heat-emission electronic circuit device provided in the circuit board,
wherein the cover member comprises a printing layer having a pattern printed with a thermally conductive material, or a thermally conductive membrane on a surface of at least some of the yarns, and
the printing layer or the thermally conductive membrane is disposed adjacent to the heat-emission electronic circuit device.

18. The electronic device of claim 17, further comprising a thermal interface member provided between the heat-emission electronic circuit device and the cover member.

19. The electronic device of claim 16, further comprising a heat-emission electronic circuit device provided on the circuit board,
wherein at least some of yarns forming the cover member are formed of a thermally conductive material and the yarns formed of the thermally conductive material are disposed adjacent to the heat-emission electronic circuit device.

20. The electronic device of claim 19, further comprising a thermal interface member provided between the heat-emission electronic circuit device and the cover member.

21. The electronic device of claim 16,
wherein the cover member comprises a printing layer having a pattern printed with an electrically conductive material or an electrically conductive membrane formed on a surface of at least some of the yarns, and
wherein the printing layer or the electrically conductive membrane is connected to the transmission/reception circuit module.

22. The electronic device of claim 21, further comprising a connection terminal that contacts the printing layer or the electrically conductive membrane.

23. The electronic device of claim 16, further comprising a connection terminal that contacts the yarns formed of the electrically conductive material.

24. The electronic device of claim 16, wherein the cover member further comprises:
a front case and a rear case that are coupled facing each other to form a main body; and
a battery cover provided removably from a surface of the main body, and
wherein the circuit board is received in the main body.

25. The electronic device of claim 24, wherein at least a portion of the battery cover comprises an electrically conductive portion having a different dielectric constant than another portion.

26. The electronic device of claim 24, wherein the cover member further comprises a frame mounted to enclose at least a portion of the main body.

27. The electronic device of claim 25, further comprising a connection terminal provided on the surface of the main body,
wherein the connection terminal is connected to the electrically conductive portion of the battery cover.

28. The electronic device of claim 26,
wherein at least a portion of the frame comprises an electrically conductive portion having a different dielectric constant than another portion, and wherein the electrically conductive portion of the frame is connected to a grounding portion of the electronic device.

* * * * *